US011527017B1

United States Patent
Good et al.

(10) Patent No.: US 11,527,017 B1
(45) Date of Patent: Dec. 13, 2022

(54) SYSTEMS AND METHODS FOR DYNAMIC DECIMATION OF POINT CLOUDS AND DATA POINTS IN A THREE-DIMENSIONAL SPACE

(71) Applicant: Illuscio, Inc., Culver City, CA (US)

(72) Inventors: Max Good, Los Angeles, CA (US); Nicholas Frank Hammerle, Los Angeles, CA (US); Kevan Spencer Barsky, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/735,893

(22) Filed: May 3, 2022

(51) Int. Cl.
G06T 9/00 (2006.01)

(52) U.S. Cl.
CPC ..................... G06T 9/00 (2013.01)

(58) Field of Classification Search
CPC ........................................ G06T 9/00
USPC .......................................... 382/313
See application file for complete search history.

(56) References Cited

U.S. PATENT DOCUMENTS

| | | | |
|---|---|---|---|
| 10,853,955 B1 * | 12/2020 | Monaghan | G06F 21/6209 |
| 11,074,703 B1 | 7/2021 | Monaghan et al. | |
| 2008/0072078 A1 | 3/2008 | Ito | |
| 2016/0088286 A1 | 3/2016 | Forsythe et al. | |
| 2019/0180502 A1 | 6/2019 | Englard et al. | |
| 2019/0197739 A1 | 6/2019 | Sinharoy et al. | |
| 2019/0236850 A1 | 8/2019 | Li | |
| 2019/0333070 A1 | 10/2019 | Lochan Dass et al. | |
| 2020/0111237 A1 | 4/2020 | Tourapis et al. | |
| 2020/0205723 A1 | 7/2020 | Massey et al. | |
| 2020/0219288 A1 | 7/2020 | Joshi et al. | |
| 2020/0221125 A1 | 7/2020 | Budagavi et al. | |
| 2020/0374498 A1 | 11/2020 | Sodhi et al. | |
| 2022/0207782 A1 * | 6/2022 | Iguchi | G06T 9/001 |

FOREIGN PATENT DOCUMENTS

CN 113781631 A * 12/2021

OTHER PUBLICATIONS

Jin, Xin & Wu, Zhaoxing & Song, Chenggen & Zhang, Chunwei & Li, Xiaodong. (2016). 3D Point Cloud Encryption Through Chaotic Mapping. 9916.119-129.10.1007/978-3-319-48890-5_12. (Year: 2016).

(Continued)

*Primary Examiner* — Wednel Cadeau
(74) *Attorney, Agent, or Firm* — Ansari Katiraei LLP; Arman Katiraei; Sadiq Ansari

(57) ABSTRACT

An editing system may dynamically and intelligently determine which data points to remove, replace, and/or modify from a point cloud space so that more features, color information, and/or detail of the point cloud are preserved after decimation. The system may receive data points that are distributed in space, and may select one or more elements of the data points on which to base the decimation. For instance, the system may decimate a first subset of the data points by a first amount based on a first difference in values defined for the one or more elements of the first subset of data points, and may decimate a different second subset of the data points by a different second amount based on a second difference in values defined for the one or more elements of the second subset of data points.

20 Claims, 14 Drawing Sheets

(56) References Cited

OTHER PUBLICATIONS

A. Jolfaei, X. Wu and V. Muthukkumarasamy, "A 3D Object Encryption Scheme Which Maintains Dimensional and Spatial Stability," in IEEE Transactions on Information Forensics and Security, vol. 10, No. 2, pp. 409-422, Feb. 2015, doi: 10.1109/TIFS.2014.2378146. (Year: 2015).

Yang, X., & Zhang, H. (2016). Encryption of 3D point cloud object with deformed fringe. Advances in Optical Technologies, 2016 doi:http://dx.doi.org/10.1155/2016/4601462 (Year: 2016).

* cited by examiner

SYSTEMS AND METHODS FOR DYNAMIC DECIMATION OF POINT CLOUDS AND DATA POINTS IN A THREE-DIMENSIONAL SPACE

BACKGROUND

A point cloud may include millions or billions of data points for generating a high-resolution representation of an object, environment, and/or dataset. Loading, processing, editing, rendering, and/or otherwise interacting with such point clouds may overwhelm the memory, processing, and/or other resources of a computer system. Consequently, the user experience may be compromised as the computer system may become slow to respond, unresponsive, or may even crash.

DETAILED DESCRIPTION OF PREFERRED EMBODIMENTS

Figure 1:
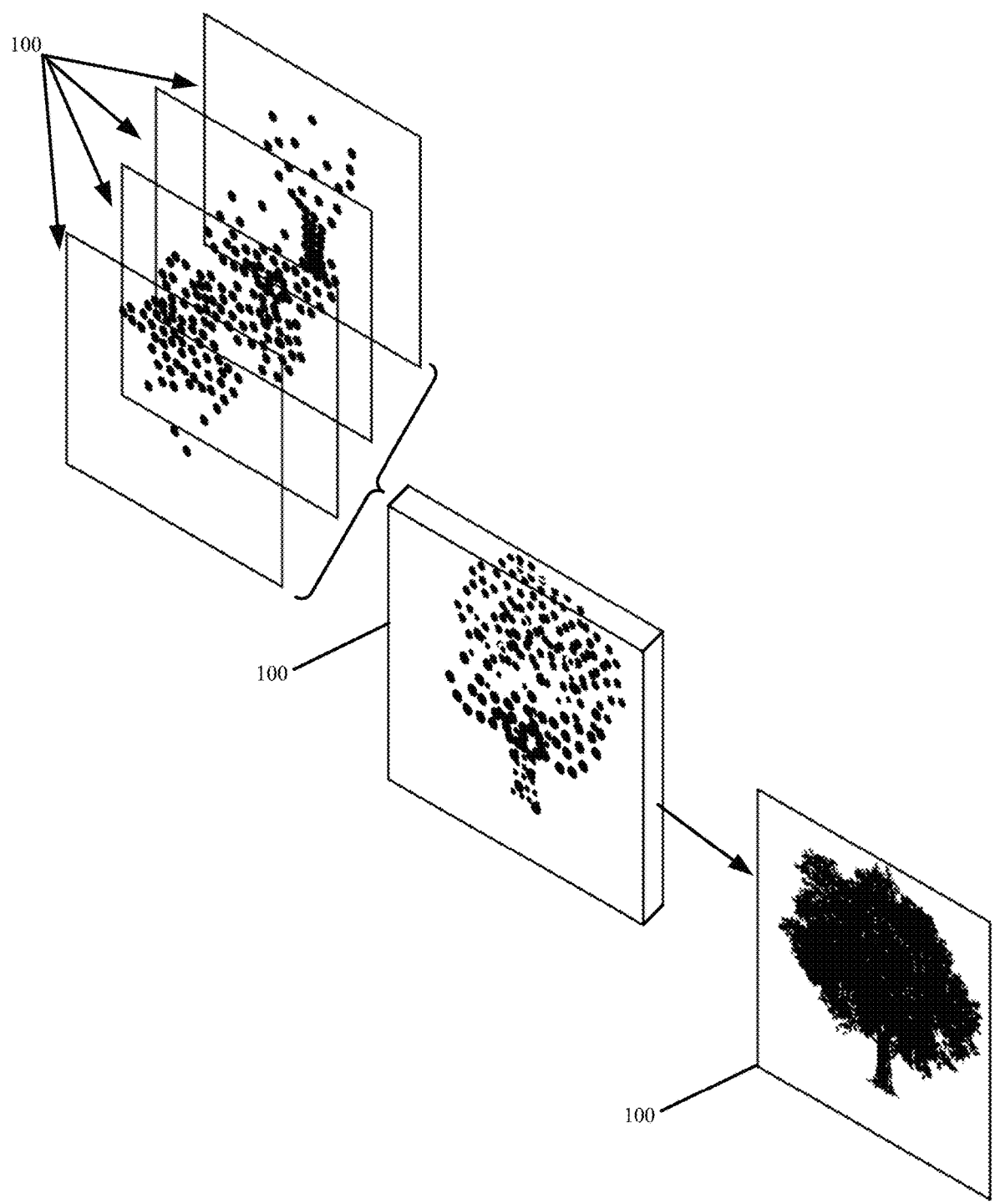
FIG. 1 illustrates an example point cloud that represents a three-dimensional ("3D") object or 3D environment using data points with different characteristics at different 3D positions.

The following detailed description refers to the accompanying drawings. The same reference numbers in different drawings may identify the same or similar elements.

Provided are systems and methods for dynamic decimation of point clouds and/or data points in a multi-dimensional space. The dynamic decimation may include reducing the amount of data or the number of data points that are retained in memory and that are processed, edited, rendered, and/or otherwise interacted with when working with environments, objects, and/or data that are represented by data points (e.g., point clouds). Accordingly, the dynamic decimation may reduce the memory, processing, and/or other resources required from a computer system, thereby improving the user experience and performance of the computer system when working with highly detailed environments, objects, and/or data represented by large numbers of data points. In some embodiments, changes may be made to a decimated point cloud so that the effects may be quickly generated and/or visualized. Once the desired effect is achieved, the changes may be applied to the original undecimated point cloud.

The dynamic decimation performed by the disclosed systems and methods differ from basic or static decimation techniques. For instance, basic or static decimation techniques may specify a percentage or number of data points to remove from a point cloud, and the techniques may involve sequentially removing that number or percentage of data points. For instance, a basic or static decimation for a 50% reduction in the point cloud size may involve removing every other data point in the point cloud. This manner of decimating a point cloud does not take into account the detail, positional (e.g., spacing) information, and non-positional (e.g., coloring) information that is lost, and often produces undesired results when the point cloud has a non-uniform distribution of data points in three-dimensional ("3D") space or non-uniform densities of data points in different regions of the point cloud.

The dynamic decimation may include dynamically and intelligently determining which data points to remove, replace, and/or modify so that more features, color information, and/or detail of the point cloud are preserved relative to a basic or static decimation technique despite the same overall number of data points being removed, replaced, and/or modified. In other words, the dynamic decimation may manipulate sets of data points differently based on different data point densities, different data point spacing, and/or dynamically determined commonality in the coloring, material properties, and/or other non-positional values of the data points.

The dynamic decimation may involve applying different changes to the point cloud data points. For instance, the dynamic decimation may include removing some data points, replacing other data points with new data points, and/or coalescing two or more data points into a single data by averaging, disproportionality weighting, and/or selecting peak, minimums, or other values of the two or more data points for the single data point.

The dynamic decimation may reduce the amount of data that is needed to process, edit, render, and/or otherwise work with a point cloud while selectively retaining the important features, details, and/or other aspects of the point cloud relative to a basic or static decimation technique. The dynamic decimation may therefore improve computer system performance.

FIG. 1 illustrates an example point cloud 100 that represents a 3D object or 3D environment using data points with different characteristics at different 3D positions. The point cloud data points may differ from pixels of a two-dimensional ("2D") image, because certain regions of point cloud 100 may have no data points, lower densities of data points, and/or higher densities of data points based on varying amounts of visual information that is detected or scanned at those regions. Additionally, the position of the point cloud data points may be defined in 3D space using x, y, and z coordinate values. In contrast, pixels of a 2D image are defined in 2D space and have a uniform density or fixed arrangement that is defined by the resolution of the 2D image. In other words, the point cloud data points may have a non-uniform placement or positioning, whereas the 2D image may have pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), and/or other properties of the imaged surface, feature, or article.

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

Point cloud 100 and the individual data points of point cloud 100 may be generated by a 3D or depth-sensing camera, Light Detection and Ranging ("LiDAR") sensor, Magnetic Resonance Imaging ("MM") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to create the point cloud 100.

Dynamically decimating point cloud 100 may include evaluating the positional and/or non-positional elements of the data points in order to identify different densities, color commonality, material property commonality, and/or other commonality in the positional and/or non-positional elements with which subsets of the data points may be dynamically differentiated. Dynamically decimating point cloud 100 may further include selectively removing, replacing, and/or modifying two or more of the data points based on the data point differentiation.

Figure 2:
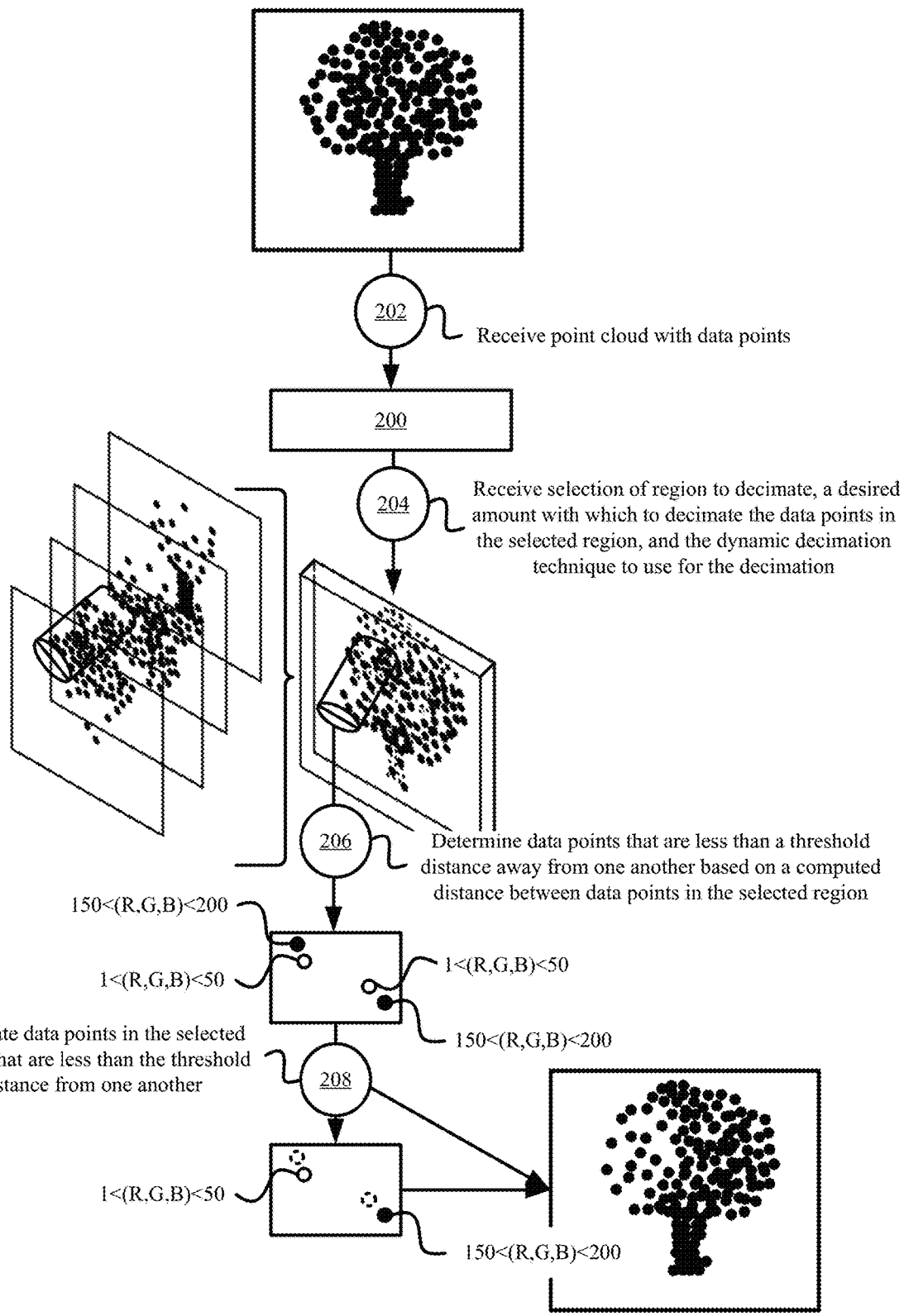
FIG. 2 illustrates an example of decimating a point cloud based on dynamically detected commonality between the point cloud data points in accordance with some embodiments presented herein.

FIG. 2 illustrates an example of decimating a point cloud based on dynamically detected commonality between the point cloud data points in accordance with some embodiments presented herein. Point cloud editing system ("PCES") 200 may receive (at 202) a point cloud that represents an object, environment, or dataset with a plurality of data points. PCES 200 may receive (at 202) in response to a user opening, loading, and/or otherwise requesting access to the point cloud in a point cloud viewing, editing, and/or interaction application.

The user may use a selection tool of PCES 200 to select (at 204) a particular region or volume within the point cloud to decimate. The selection may include a set of data points that are distributed in the particular region or volume of space selected by the user. In some embodiments, the selection may include the entire point cloud or all data points of the point cloud. In some embodiments, the selection tool may be used to perform an inverted selection in which all data points outside the particular region or volume may be selected for edited and all data points inside the particular region or volume are unselected.

The user may also specify (at 204) a desired amount of decimation to apply to the selected data points, and a dynamic decimation technique to use for the decimation of the selected data points, wherein different dynamic decimation techniques described below may remove, replace, and/or otherwise modify different subsets of the data points based on different criteria. The desired amount of decimation may be specified as a percentage, a number of data points, or as a desired density (e.g., X number of data points per unit of space).

PCES 200 may compute the distance between different pairs of the set of data points. Based on the computed distance, PCES 200 may determine (at 206) data points that are less than a threshold distance away from one another, and thereby represent a dense subregion that may be decimated with minimal loss to features, color information, and/or detail in that subregion. For instance, the user may set a desired amount of decimation that reduces the density in the selected particular region or volume to two data points per one millimeter of cubic space. Accordingly, PCES 200 may identify subregions within the selected particular region or volume where three or more data points are separated by less than one millimeter distance.

PCES 200 may dynamically decimate (at 208) the data points in the subregions with three or more data points per one millimeter of cubic space, and may preserve the data points in the other subregions with less than three data points per millimeter of cubic space. Rather than randomly or sequentially select one or more data points to remove from a subregion selected for decimation, PCES 200 may compare the non-positional values of the three or more data points in that subregion for commonality. As shown in FIG. 2, an identified dense subregion may contain two data points with a first range of color values that are within a threshold of one another and two data points with a different second range of color values that are within the threshold of one another. PCES 200 may dynamically decimate (at 208) the identified dense subregion based on the detected commonality. For instance, PCES 200 may intelligently remove one of the two data points with the first range of color values, and may intelligently remove one of the two data points with the second range of color values instead of removing both of the data points with the first range of color values or both of the data points with the second range of color values. In this manner, PCES 200 may decimate (at 208) the identified dense subregion to the desired density while preserving the color information of that identified subregion (e.g., one sample from each of the first range of color values and the second range of color values).

The decimated regions may include fewer data points than the regions prior to the decimation. Accordingly, fewer memory, processing, and/or other computer system resources are needed to process, edit, render, and/or otherwise work with the decimated regions than the regions prior to the decimation. The computer system may therefore become more responsive, and any changes made or effects applied to the decimated regions may be completed in less time as the computer system has fewer data to load in memory and fewer data to process with each change or applied effect. Users may prefer working with the decimated regions to visualize the changes or effects, and once a desired outcome is reached, PCES 200 may apply the final changes or effects to the undecimated regions of the original point cloud.

In some embodiments, PCES 200 may dynamically decimate data points within a region by replacing two or more data points in the region with a newly defined data point. In this manner, PCES 200 may reduce the density or number of data points within the region via the data point replacement. However, PCES 200 may preserve more features, color information, and/or detail by deriving the positional and/or non-positional values of the newly defined data point based on the corresponding positional and/or non-positional values of the two or more replaced data points.

Figure 3:
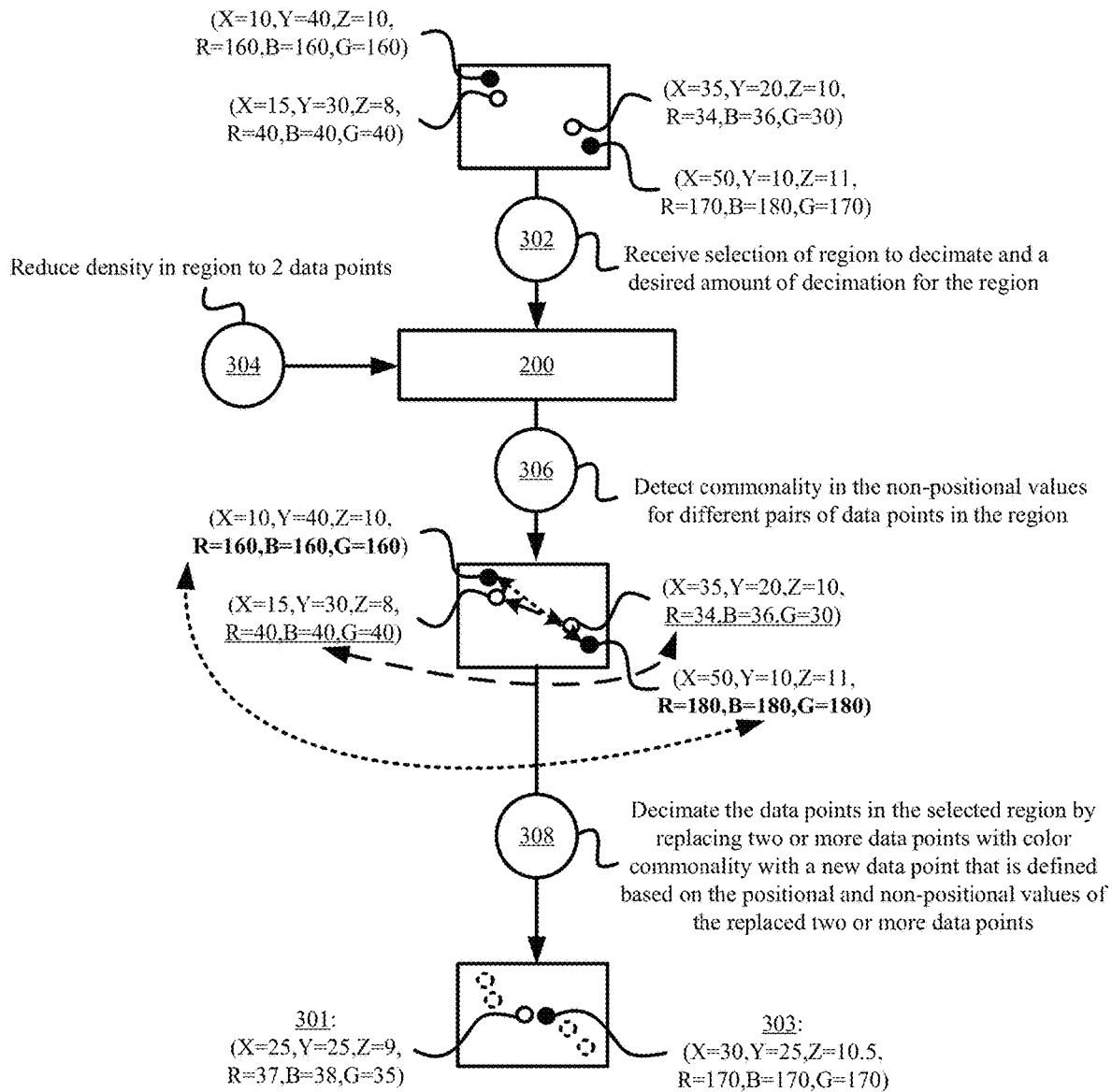
FIG. 3 illustrates an example of decimating a point cloud based on a dynamically generated data point that replaces two or more other data points in accordance with some embodiments presented herein.

FIG. 3 illustrates an example of decimating a point cloud based on a dynamically generated data point that replaces two or more other data points in accordance with some embodiments presented herein. As shown in FIG. 3, PCES 200 may receive (at 302) a region that is selected for decimation and that includes two data points with the first range of color values and two data points with the second range of color values. PCES 200 may also receive (at 304) a user specified amount with which to decimate the selected region. In this example, the user may set a desired amount of decimation that reduces the density in the region to two data points.

PCES 200 may compare the non-positional values of the four data points to detect (at 306) commonality between the two data points with the first range of color values, and between the two data points with the second range of color values. However, rather than remove one data point within each range of color values as was done in FIG. 2, PCES 200 may replace (at 308) the two data points with the first range of color values with first new data point 301, and may replace (at 308) the two data points with the second range of color values with second new data point 303.

Replacing (at 308) the two data points with the first range of color values may include defining the x, y, and z coordinates or positional values of first new data point 301 based on the median or average of the x, y, and z coordinates of the two data points with the first range of color values, and defining the non-positional values of first new data point 301 based on the average of the non-positional values of the two data points with the first range of color values. Similarly, PCES 200 may define the x, y, and z coordinates or positional values of second new data point 303 based on the median or average of the x, y, and z coordinates of the two data points with the second range of color values, and may define the non-positional values of second new data point 303 based on the average of the non-positional values of the two data points with the second range of color values.

In some embodiments, PCES 200 may size newly added data points 301 and 303 to be equal to the size of the individual data points being replaced by newly added data point 301 and 303. In some other embodiments, PCES 200 may increase the size of newly added data points 301 and 303 to be larger than the size of the individual data points being replaced by newly added data points 301 and 303. For instance, if a newly added data point replaces two data points, PCES 200 may increase the size of the newly added data point to occupy the same region or volume of space as the two data points it replaces.

In some embodiments, PCES 200 may remove one or more data points that have non-positional commonality or may replace data points that have non-positional commonality with a newly defined data point when the data points that have the non-positional commonality in a region selected for decimation are less than a specified distance from one another. The dynamic decimation may use the positional constraint to avoid eliminating detail from different parts of a region.

Figure 4:
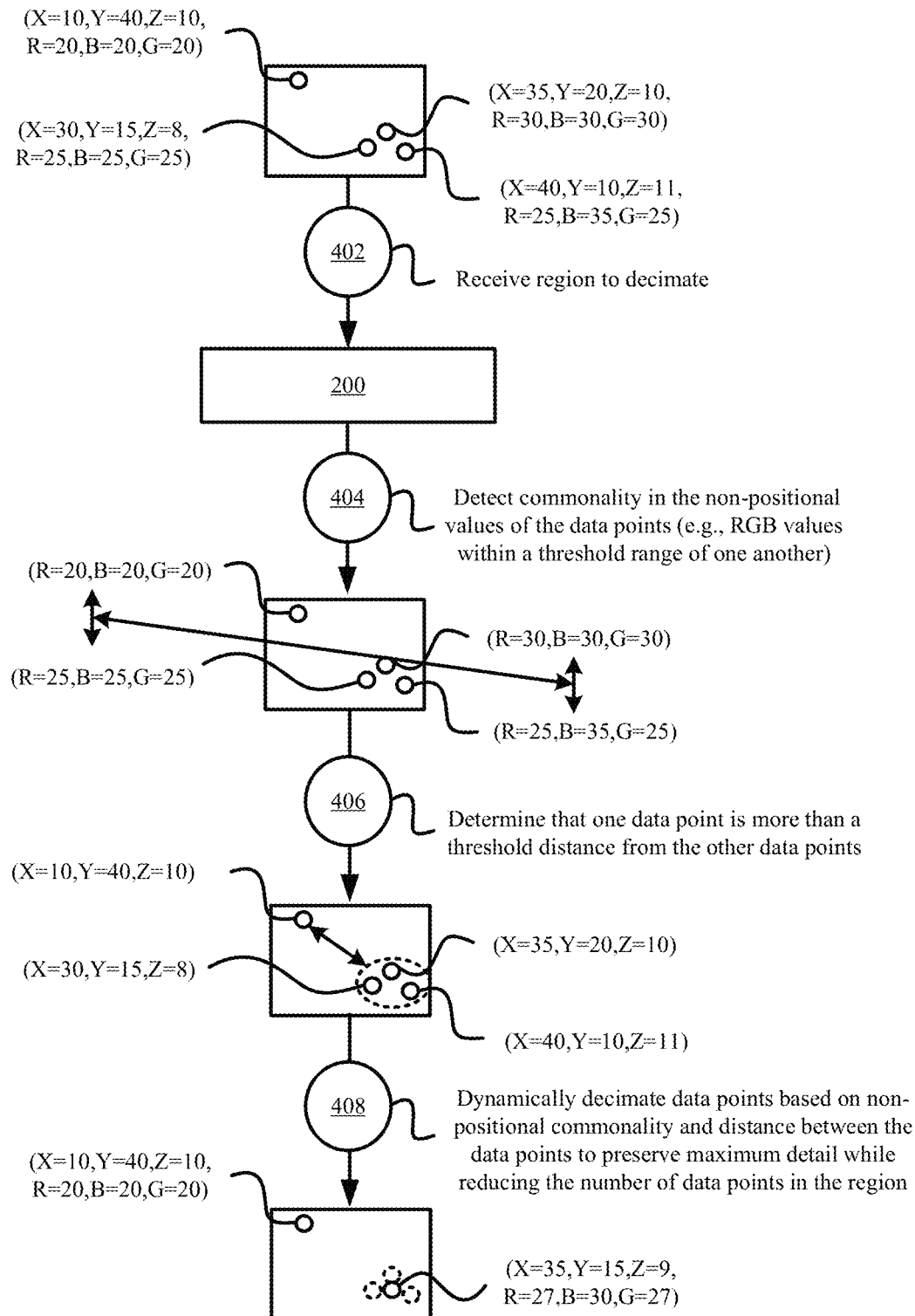
FIG. 4 illustrates an example of dynamically decimating data points in a region based on non-positional commonality and distance between the data points in accordance with some embodiments presented herein.

FIG. 4 illustrates an example of dynamically decimating data points in a region based on non-positional commonality and distance between the data points in accordance with some embodiments presented herein. As shown in FIG. 4, PCES 200 may receive (at 402) a region that contains four data points and that is selected for decimation.

PCES 200 may compare (at 404) the non-positional elements of the four data points to determine that the four data points have color commonality. Specifically, PCES 200 may determine that the color values of the four data points are within a threshold range of one another.

PCES 200 may compute the distance between each of the data points in the region. Based on the computed distance, PCES 200 may determine (at 406) that three of the data points are clustered closely together and are within a threshold distance of one another while a fourth data point is more than the threshold distance from the other data points.

Rather than replace all four data points with a single newly defined data point or remove the fourth data point and one or more other data points in order to decimate the region, PCES 200 may preserve (at 408) the fourth data point because it provides differentiable detail that would be lost if removed, whereas the other three closely clustered data points may be replaced (at 408) with a single newly defined data point without losing the detail that is provided by those three data points. Accordingly, PCES 200 may dynamically decimate (at 408) the region based on the color commonality and the distance between the data points so that the maximum amount of detail is preserved while still reducing the amount of data or the number of data points within the selected region.

In some embodiments, PCES 200 may dynamically define the non-positional values of a newly added data point based on the maximum, minimum, or weighted non-positional values of the replaced data points. PCES 200 may use the maximum, minimum, or weighted non-positional values to better preserve color accuracy and detail in decimated regions that contain reflections, highlights, shadows, lowlights, and/or variations in contrast to other regions of the same point cloud.

Figure 5:
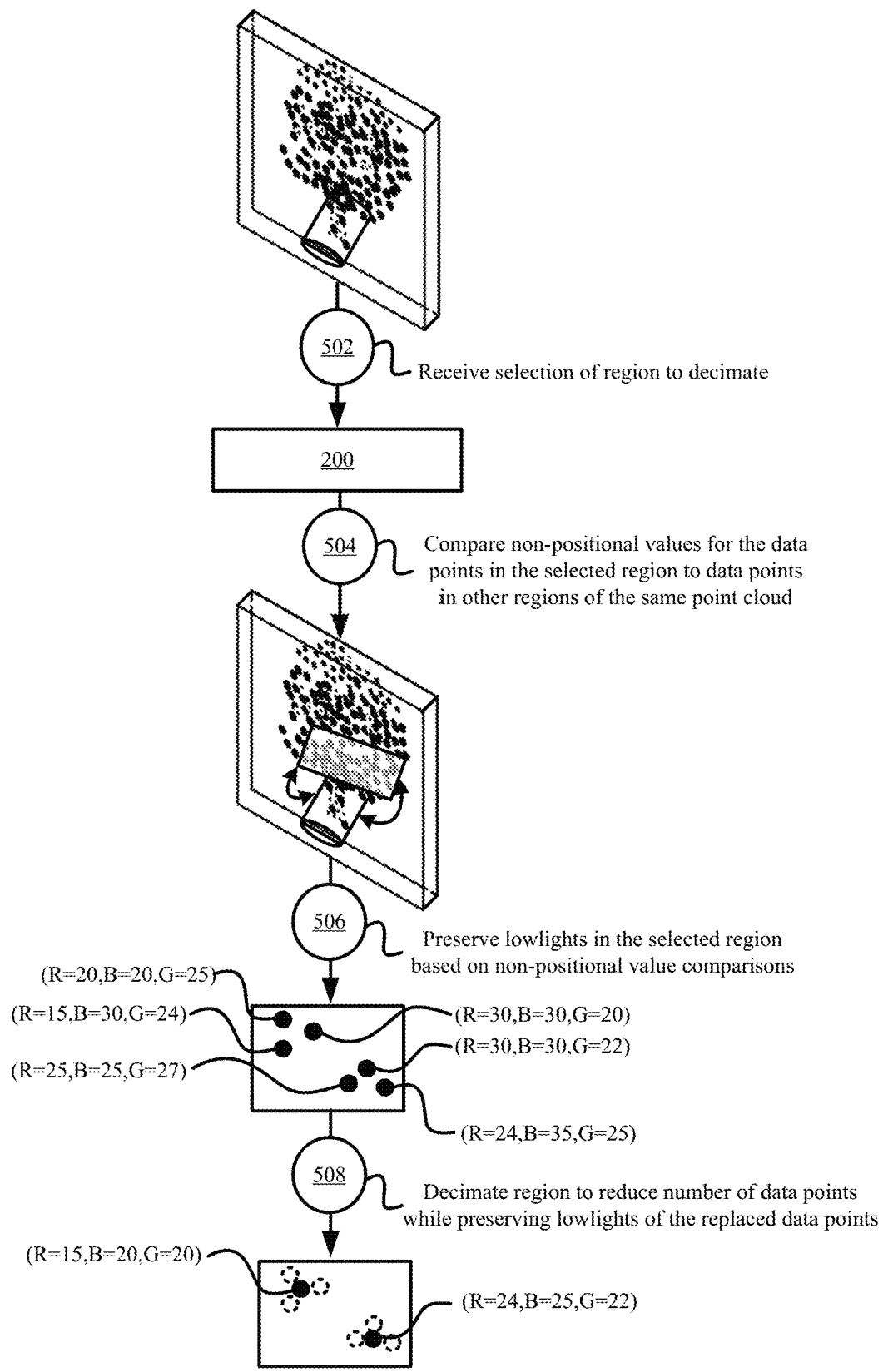
FIG. 5 illustrates an example of decimating a particular region based on dynamically selected non-positional values in accordance with some embodiments presented herein.

FIG. 5 illustrates an example of decimating a particular region based on dynamically selected non-positional values in accordance with some embodiments presented herein. PCES 200 may receive (at 502) a selection that targets the particular region for decimation, and/or a specified amount of decimation for the particular region.

PCES 200 may compare (at 504) the white levels and/or other non-positional values for the data points in the particular region to data points in other regions of the same point cloud. For instance, PCES 200 may compare (at 504) the brightness, contrast, saturation, and/or other visual characteristics of the different regions.

PCES 200 may determine that the particular region selected for decimation is darker and/or has more lowlights than the other regions of the point cloud. Accordingly, PCES 200 may dynamically determine (at 506) to preserve the lowlights of the particular region relative to the other regions during decimation.

During decimation, PCES 200 may define (at 508) one or more new data points with each new data point replacing two or more existing data points in the particular region. PCES 200 may derive (at 508) the non-positional values of each new data point based on the minimum or darkest color values of the two or more data points that the new data point replaces or by weighting the minimum or darkest color values more than other color values of the two or more data points. For instance, if the two or more data points being replaced by a newly defined data point have color values that are within a threshold range of one another, PCES 200 may derive the non-positional values of the new data point based on the data points with the darkest color values or least gain. Alternatively, if the two or more data points being replaced include a first data point with non-positional values that contribute to the highlights in the region and a second data point with non-positional value that contribute to the lowlights in the region, PCES 200 may define the non-positional values of the new data point based on the non-positional values of the second data point only.

In some embodiments, PCES 200 may preserve highlights, lowlights, and/or dynamically selected non-positional values (e.g., brightness, contrast, saturation, white levels, etc.) without defining new data points. In some such embodiments, PCES 200 may selectively remove the data points in the region that do not contribute to or contain the dynamically selected non-positional values. For instance, PCES 200 may determine that a region selected for decimation is darker and/or has more lowlights than the other regions of the point cloud. PCES 200 may compare the color values of the data points in the region to selectively determine which of the data points to eliminate. Accordingly, if the region includes a first data point with non-positional values that contribute to the highlights in that region and a second data point with non-positional value that contribute to the lowlights in that region, PCES 200 may remove the first data point and retain the second data point to preserve the lowlight visual information for the region.

In some embodiments, the dynamic decimation may adapt to preserve different features and/or details in a region. For instance, the dynamic decimation may increase the decimation in regions with little to no variance and that have little differentiable detail, and may decrease the decimation in regions with large amounts of variance and that have lots of differentiable detail. Similarly, the dynamic decimation may include increasing the decimation along uniform flat, continuous, and/or static surfaces, and decreasing the decimation along non-uniform edges, curves, and/or other changing surfaces.

Figure 6:
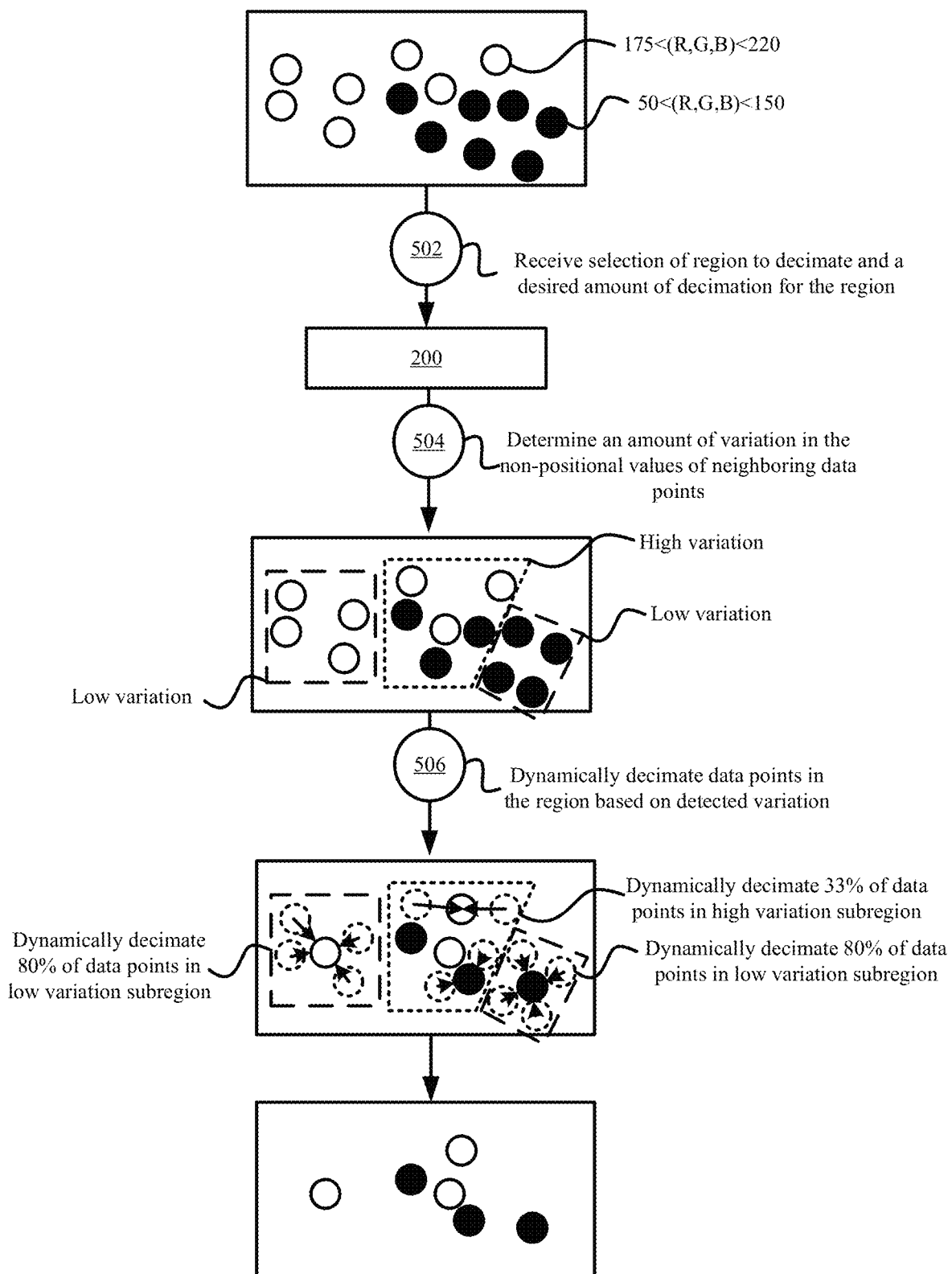
FIG. 6 illustrates an example of dynamically decimating a point cloud to preserve detail in accordance with some embodiments presented herein.

FIG. 6 illustrates an example of dynamically decimating a point cloud to preserve detail in accordance with some embodiments presented herein. PCES 200 may receive (at 602) a selection of a region or volume that is targeted for decimation, and a specified decimation for that region or volume.

PCES 200 may determine the set of data points that are positioned within the selected region, and may compare the non-positional values (e.g., the color values) of neighboring data points (e.g., data points that are adjacently positioned or a threshold distance from one another). From the comparison, PCES 200 may determine (at 604) an amount of variation in the non-positional values of neighboring data points. Specifically, PCES 200 may identify the range of different color values defined for a subset of neighboring data points. A subset of neighboring data points may have little variation when the difference between the color values of each data point in the subset is less than a specified threshold or percentage. For instance, if the RGB color components of all data points in the subset vary by less than 30%, then PCES 200 may determine that the subset of data points has little variation. Conversely, if the RGB color components of all data points in the subset varies by more than 30% or the RGB color components between multiple pairs of neighboring data points fluctuates by more than 30%, then PCES 200 may determine that the subset of data points has large amounts of variation. A subset of data points with little variation may represent points about the same surface or material, whereas a subset of data points with lots of variation may represent transitional edges of different surfaces or materials, convergence of different objects or materials, and/or a surface with lots of variation in detail, coloring, and/or other visual characteristics.

PCES 200 may decimate (at 606) a first subregion with little variation between the data points in the first subregion more than a second subregion with lots of variation between the data points in the second subregion. For instance, PCES 200 may remove or replace more of the data points in the first subregion than the data points in the second subregion. The dynamic decimation based on the non-positional variation may preserve detail in the subregions that have lots of variation, and may decrease the detail in the subregions that have little variation so that the overall impact of the decimation on the resulting image is minimized.

Figure 7:
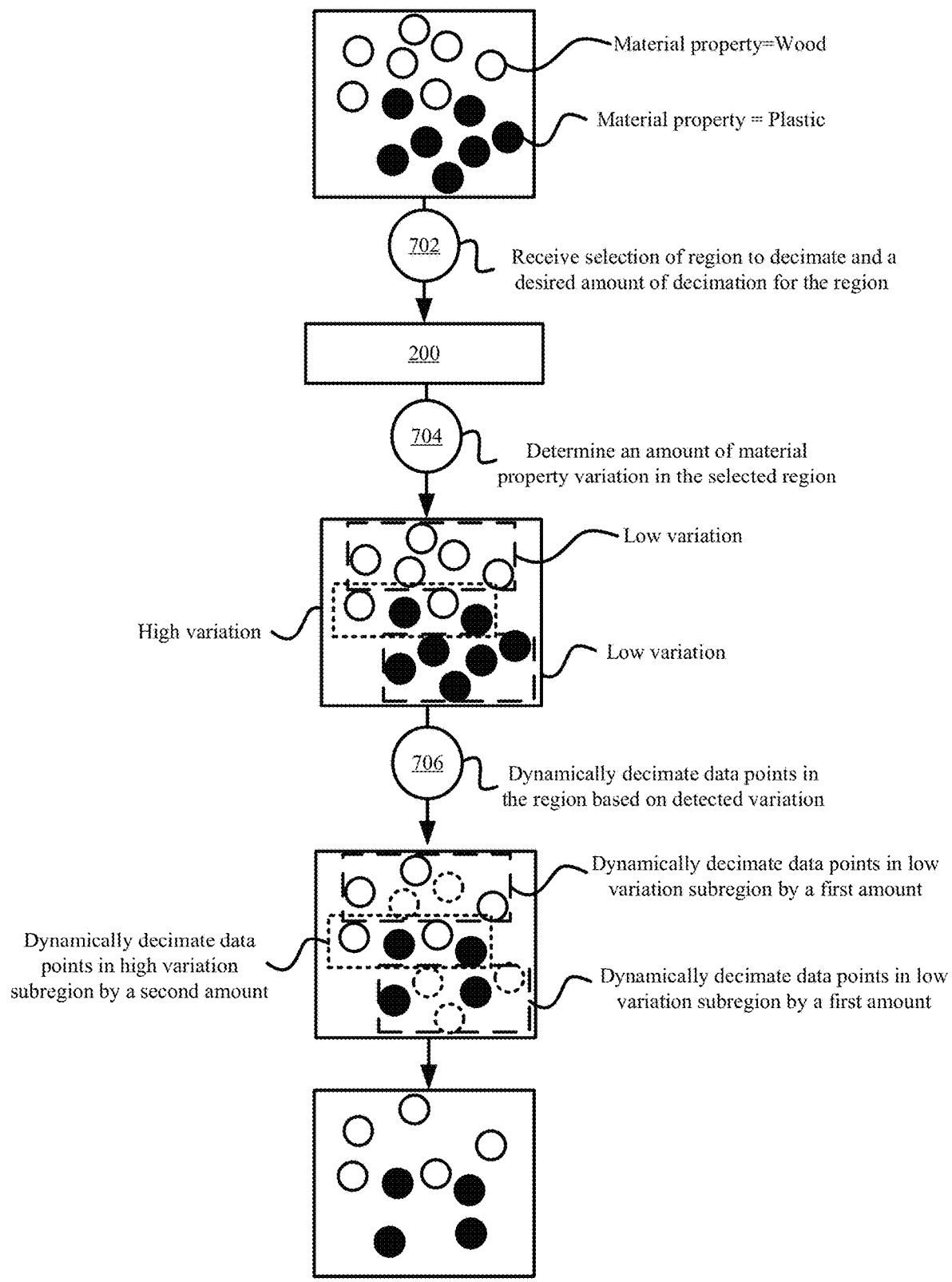
FIG. 7 illustrates an example of dynamically adjusting the amount of decimation that is applied to data points of a point cloud based on the amount of variation in the material property of the neighboring data points.

In some embodiments, variations in non-positional values other than color values may be used to detect and preserve edge detail or regions where different objects or surfaces converge. FIG. 7 illustrates an example of dynamically adjusting the amount of decimation that is applied to data points of a point cloud based on the amount of variation in the material property of the neighboring data points.

As shown in FIG. 7, PCES 200 may receive (at 702) a selected region in which the data points may be defined with positional values and non-positional values that indicate either a "wood" or "plastic" material represented by each data point. PCES 200 may compare the material property of neighboring data points to determine (at 704) the amount of material property variation throughout the selected region. For instance, rapid variations in the material property of neighboring data points may indicate an edge or convergence of two objects, and PCES 200 may dynamically determine (at 706) to reduce the number of data points that are decimated in regions with rapid variations in the material property of neighboring data points, and/or to increase the number of data points that are decimated in regions with little or no variation in the material property of neighboring data points. Accordingly, PCES 200 may dynamically decimate (at 706) the selected region to preserve detail in subregions with a changing material property, and to minimize the detail in subregions with a common material property.

In some embodiments, regions with important or changing features or detail may be differentiated from other regions with unimportant or static features or detail based on the point normal of the data points in those region. The point normal may be a non-positional value that identifies the orientation and/or direction of a data point relative to the surface or object represented by that data point. The point normals may be used to accurately represent the curvature of the surface or object, and may be used to compute reflections and/or lighting off a data point.

Figure 8:
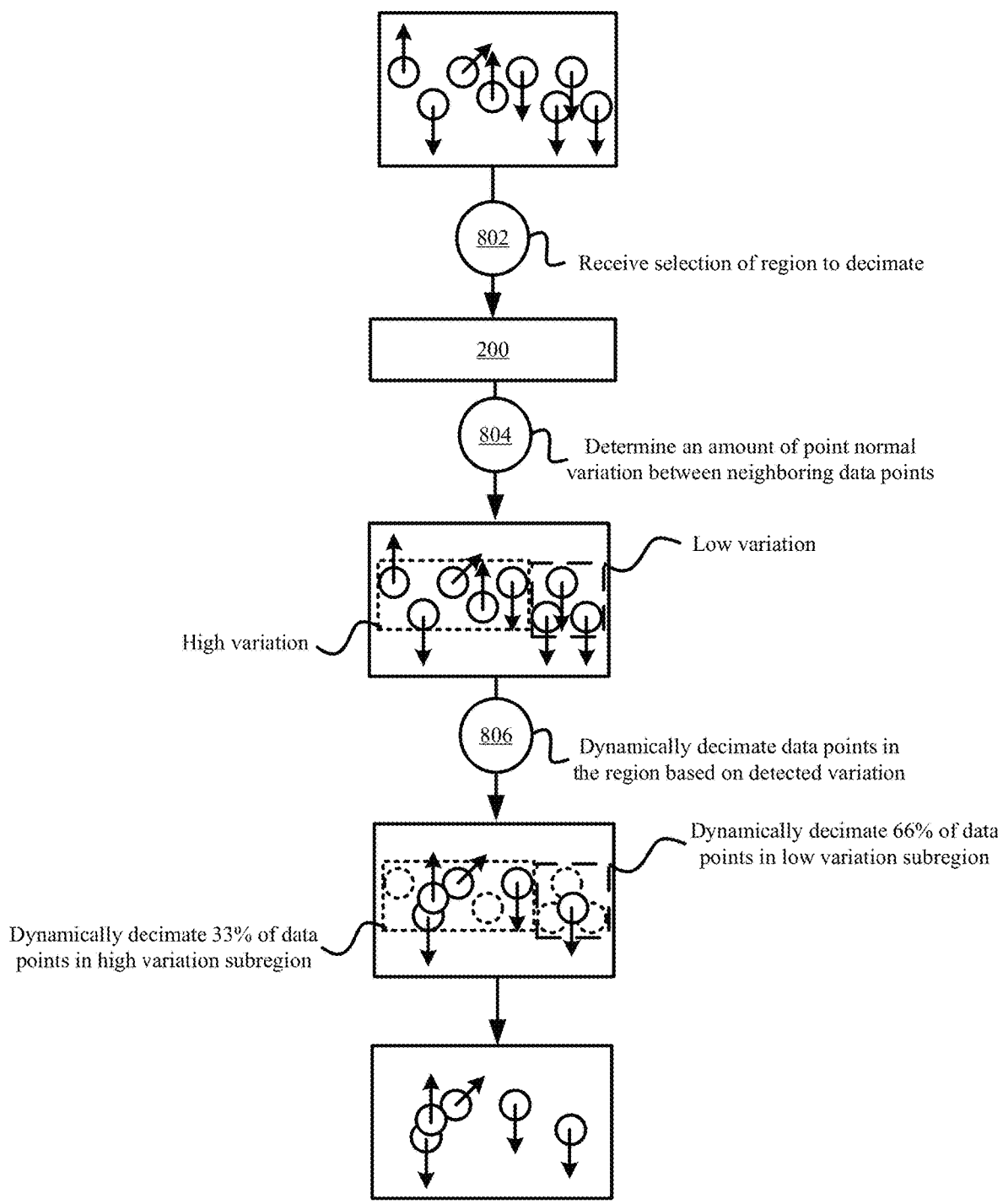
FIG. 8 illustrates an example of dynamically decimating a point cloud to preserve detail at edges or convergence locations based on the point normals of the data points in accordance with some embodiments presented herein.

FIG. 8 illustrates an example of dynamically decimating a point cloud to preserve detail at edges or convergence locations based on the point normals of the data points in accordance with some embodiments presented herein. PCES 200 may receive (at 802) a selected region of a point cloud that is targeted for decimation.

PCES 200 compare the point normals of data points in the selected region to determine (at 804) the amount of variation in the point normals of neighboring data points. In some embodiments, the data points that represent a convergence of two surfaces may have different point normals. Similarly, a curved surface may be represented by data points with changing point normals. In some embodiments, a neighboring set of data points with differing point normal may represent a falloff region between two objects that may partially overlap, and that may result in an inaccurate point cloud scan in which some data points of one object may be incorrectly oriented or positioned. Accordingly, regions with lots of point normal variation may correspond to regions with lots of change, lots of visual differentiation, or inaccurately scanned regions, whereas regions with the same or similar point normals may correspond to regions with minimal change, minimal visual differentiation, and accurate scans.

PCES 200 may dynamically decimate (at 806) the data points in the selected region by increasing the decimation in a first subregion with a subset of data points that have the same or similar point normals in order to decrease the number of data points used to represent the mostly uniform and unchanging surface represented by that subset of data points. PCES 200 may also dynamically decimate (at 806) the data points in the selected region by decreasing the decimation in a second subregion with a subset of data points that have fluctuating point normals in order to preserve the detail for edges, converging surfaces, and/or other changes occurring in the second subregion.

In some embodiments, PCES 200 may perform an inverse decimation based on the point normal variance. For instance, PCES 200 may decrease the decimation in the first subregion with same or similar point normals, and may increase the decimation in the second subregion with fluctuating point normals. By removing more of the data points in the second subregion with fluctuating point normals, PCES 200 may reduce the detail in an inaccurately captured or scanned region with a large amount of falloff. In other words, PCES 200 may improve the quality of the point cloud by removing data points that are incorrectly positioned due to scanning difficulties or imprecision.

PCES 200 may use the point normals to differentiate between accurately captured regions and inaccurately captured regions where they may be significant falloff, and may decimate the data points in the inaccurately captured regions using other non-positional values besides the point normals. For instance, PCES 200 may compute the distance between data points in the falloff region, may identify the data points that have few surrounding or neighboring data points, and may remove or apply greater decimation to the data points with fewer surrounding or neighboring data points. Alternatively, PCES 200 may identify a region with significant falloff, and may increase the decimation of data points in the falloff region that have significant color value differentiation with their surrounding or neighboring data points.

In some embodiments, the dynamic decimation may customize the amount of decimation that is applied based on varying data point densities across a point cloud and/or a region of the point cloud selected for decimation. In some such embodiments, the dynamic decimation may be keyed off commonality detected in the positional values of the data points, wherein the commonality is determined based on the distance between neighboring data points.

Figure 9:
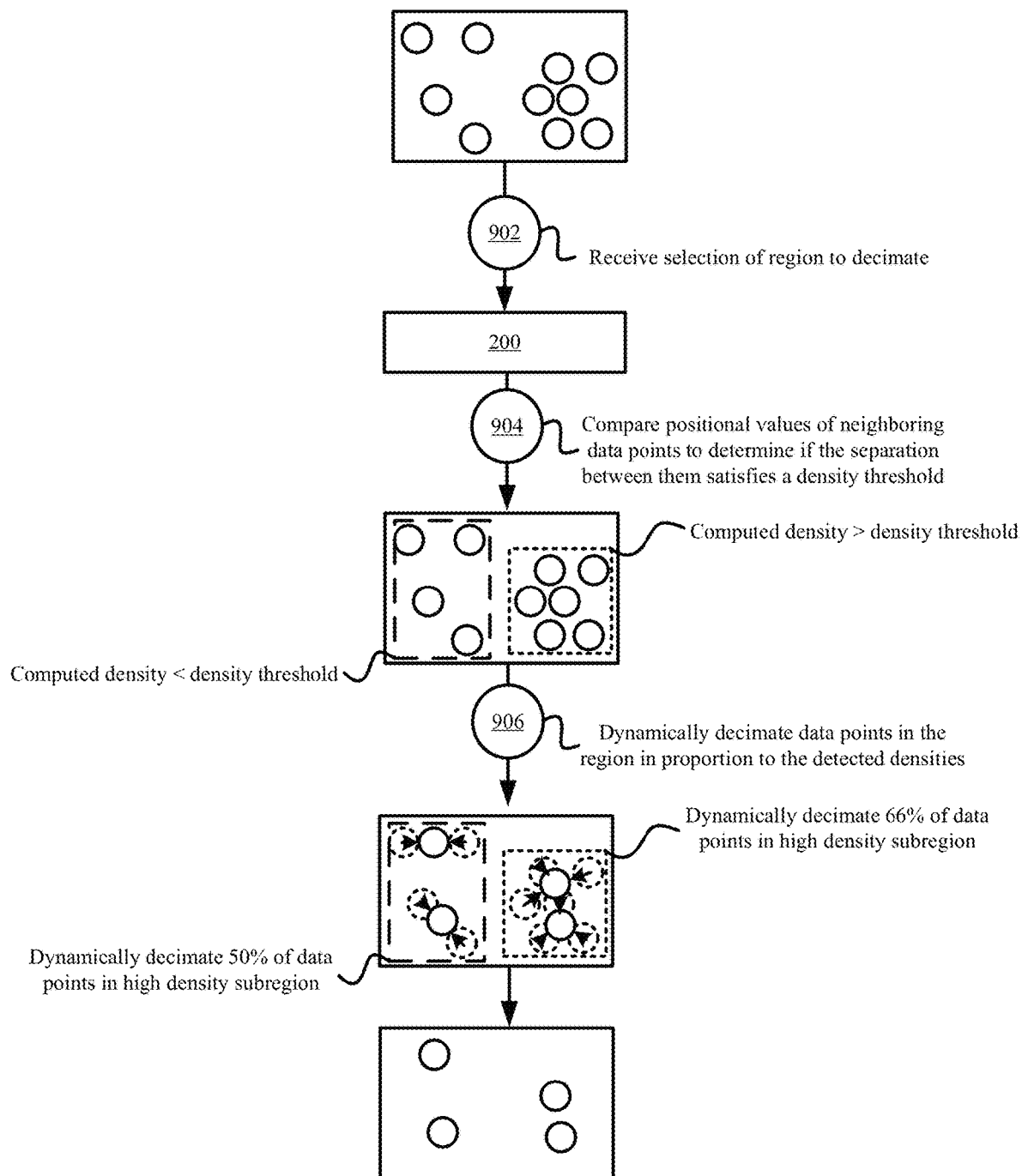
FIG. 9 illustrates an example of dynamically decimating point cloud data points that are clustered with different densities in accordance with some embodiments presented herein.

FIG. 9 illustrates an example of dynamically decimating point cloud data points that are clustered with different densities in accordance with some embodiments presented herein. As shown in FIG. 9, PCES 200 may receive (at 902) a selected region for decimation that includes a first set of data points that are clustered tightly together with a first density, and a second set of data points that are clustered loosely together with a second density that is less dense that the first density.

PCES 200 may compare (at 904) the data point positional values to determine the relative positioning and density of each set of data points. Specifically, PCES 200 may compute the distance between neighboring data points, and may compare (at 904) the computed distances against a density threshold.

In response to the first density computed for the first set of data points satisfying the density threshold, PCES 200 may decimate (at 906) the first set of data points by a first amount. In response to the second density computed for the second set of data points not satisfying the density threshold, PCES 200 may decimate (at 906) the second set of data points by a second amount that is less than the first amount. For instance, PCES 200 may remove or replace more of the first set of data points than the second set of data points so that the difference in density between each region is reduced or made the same. In other words, the dynamic decimation may be used to balance the level of detail at different parts of a point cloud with a non-uniform distribution of data points. In some embodiments, the first amount of decimation may be derived from the first density, and the second amount of decimation may be derived from the second density.

Figure 10:
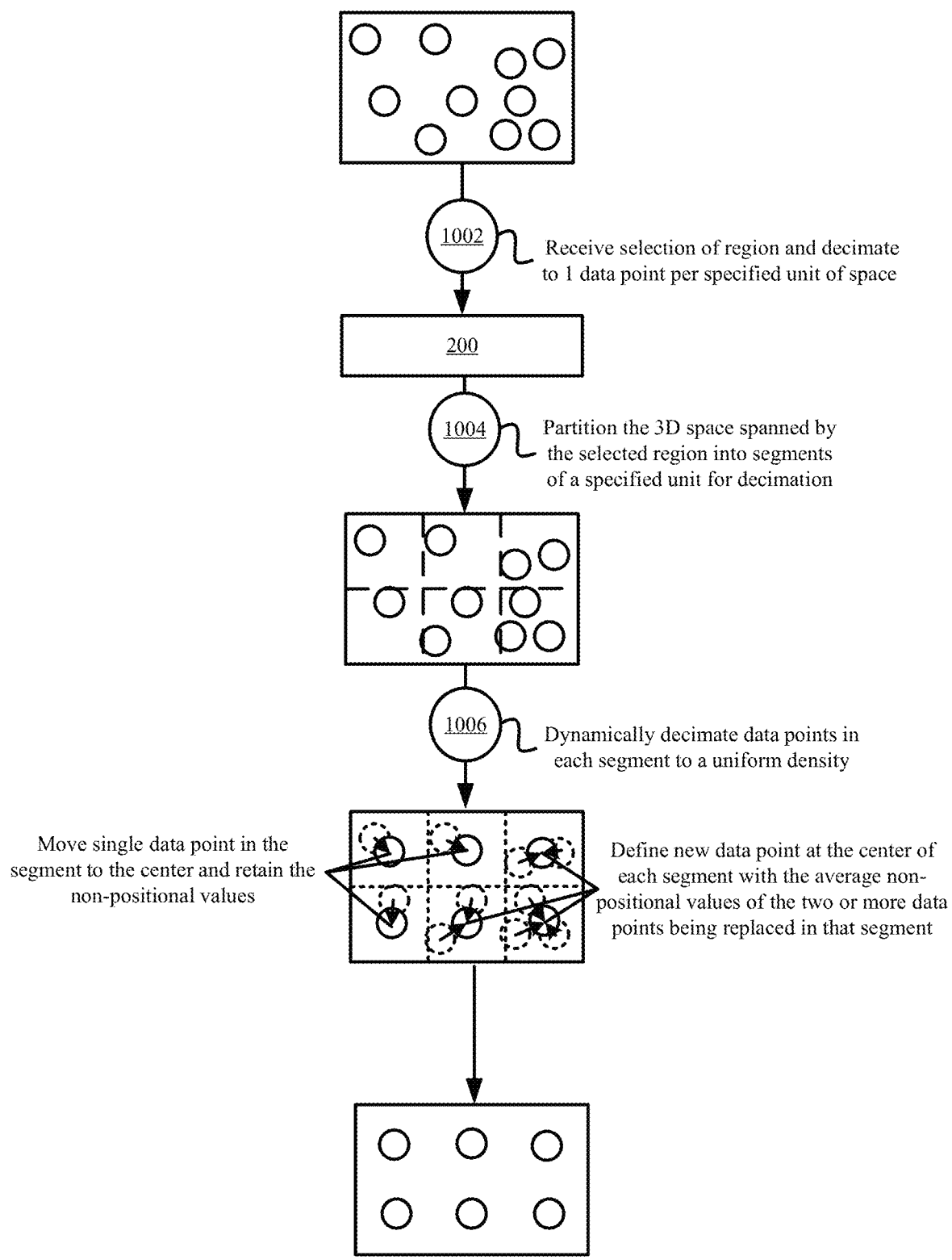
FIG. 10 illustrates an example of decimating different regions of a point cloud to a common density in accordance with some embodiments presented herein.

In some embodiments, the dynamic decimation may include decimating different regions of a point cloud to a common density so that the resolution or distribution of data points across the point cloud becomes uniform. FIG. 10 illustrates an example of decimating different regions of a point cloud to a common density in accordance with some embodiments presented herein.

PCES 200 may receive (at 1002) a point cloud or a region within the point cloud that is selected for decimation and an amount of decimation to apply. The amount of decimation may specify that the point cloud or selected region should have a common density of one data point per a specified unit or volume of space. In some embodiments, the positional coordinates of the point cloud may correspond to a particular scale. For instance, each unit change in the x, y, or z coordinates may correspond to one millimeter of change, and the specified amount of decimation may specify a maximum number of data points per cubic centimeter of space.

PCES 200 may partition (at 1004) the region or volume of space spanned by the point cloud or the selected region into segments of the specified unit or volume size. Accordingly, if the amount of decimation specifies one data point per centimeter of space, PCES 200 may partition the point cloud or the selected region into equally sized cubic volumes whose centers are separated be one centimeter.

PCES 200 may select the data points falling within the boundaries of each segment, and may replace (at 1006) the selected data points with a newly defined data point at the center of that segment. In some embodiments, the position of the newly defined data point may be determined by averaging the positional values of the data points that fall within that segment and that are replaced by the newly defined data point. The non-positional values of the newly defined data point may be based on or derived from the non-positional values of the selected data points that have been replaced. In some embodiments, the non-positional values of the newly defined data point may be the average or median values of the non-positional values from the data points within the corresponding segment.

If a segment includes a single data point, PCES 200 may reposition that data point to the center of the data point while retaining the non-positional values of the data point. Alternatively, if a segment includes a single data point, PCES 200 may not perform any adjustments or decimation to that segment or that single data point. If no data points fall within the boundaries of a particular segment, PCES 200 may leave that particular segment blank or empty.

In some embodiments, the dynamic decimation may decimate a first set of data points in a selected region by accounting for the non-positional values of a second set of data points that surround the first set of data points within the selected region. By accounting for the surrounding second set of data points, the dynamic decimation may generate a more natural looking effect in which there is a gradual reduction in data point density from the surrounding second set of data points to the center of the selected region rather than an abrupt and discontinuous change from the surrounding second set of data points to the decimated data points within the selected region. Accordingly, in some embodiments, the dynamic decimation may decimate data points in a selected region using a feathering effect.

Figure 11:
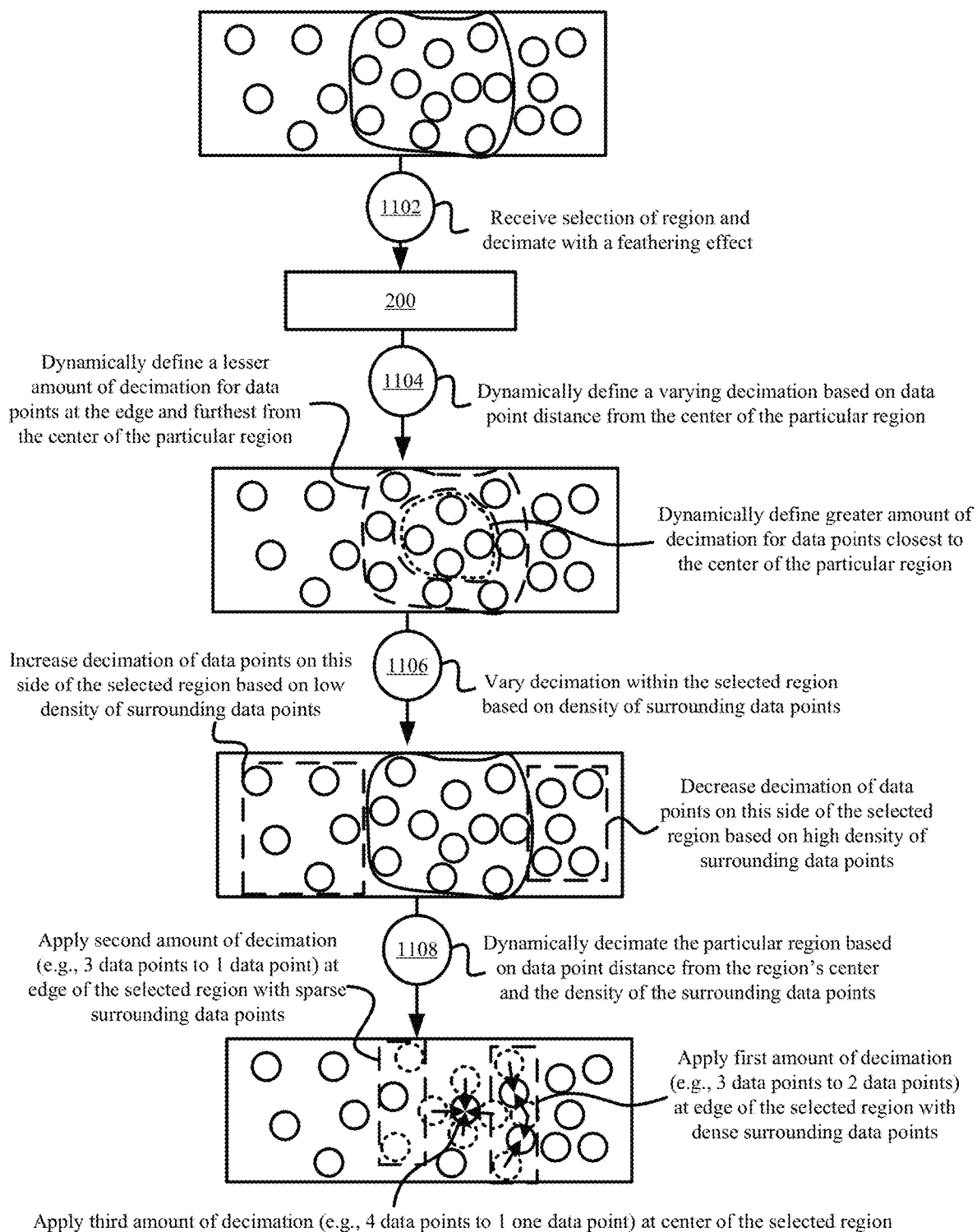
FIG. 11 illustrates an example of dynamically decimating data points with a feathering effect in accordance with some embodiments presented herein.

FIG. 11 illustrates an example of dynamically decimating data points with a feathering effect in accordance with some embodiments presented herein. PCES 200 may receive (at 1102) selection of a particular region that is to be decimated, and may receive input for decimating the particular region with the feathering effect.

PCES 200 may determine the center of the particular region, and may compute the distance between each data point in the particular region and the center. PCES 200 may dynamically define (at 1104) a varying amount of decimation to apply to the data points within the particular region based on their distance from the center of the particular region. Specifically, PCES 200 may dynamically define (at 1104) less decimation to the data points that are closer to the edges of the particular region and furthest from the center, and may gradually increase the amount of decimation for the data points that are closer to the center of the particular region.

In some embodiments, PCES 200 may dynamically decimate the data points in the particular region based on their distance from the region's center. In some other embodiments, PCES 200 may compute the density and/or non-positional value variation of the data points surrounding the particular region, and may adjust the decimation that was defined based on the data points from the region's center according to the density or non-positional value variation of the data points surrounding the particular region. For instance, ff a first set of surrounding data points at one side of the particular region is less dense or more sparsely distributed, then PCES 200 may increase the decimation that is defined for the data points in the particular region closest to the first set of surrounding data points. Similarly, if a second set of surrounding data points at an opposite side of the particular region is more dense or less sparsely distributed, then PCES 200 may decrease the decimation that is defined for the data points in the particular region closest to the second set of surrounding data points.

PCES 200 may dynamically decimate (at 1108) the data points in the particular region based on their distance from the center of the particular region and based on the density or amount of variation in the non-positional values of the surrounding data points. Consequently, PCES 200 may decimate the data points in the particular region by varying amounts. As shown in FIG. 11, the data points closest to the right edge of the particular region are the least decimated (e.g., three data points are replaced by two data points) due to their proximity to the edge of the particular region and being adjacent to densely distributed surrounding data points, the data points closest to the left edge of the particular region are moderately decimated (e.g., two of the three data points are removed) due to their proximity to the edge of the particular region and being adjacent to sparsely distributed surrounding data points, and the data points closest to the center of the particular region are the most decimated (e.g., four data points are replaced by one data point) due to their proximity to the center.

The feathering effect and the other dynamic decimations techniques of some embodiments may be used to generate various visual effects. Specifically, the feathering effect may be used to blur elements in one or more regions of the point cloud. For instance, PCES 200 or a user may select regions surrounding a primary subject, and may specify an increasing amount of decimation to data points that are further away from the data points of the primary subject. Consequently, PCES 200 may blur the data points around the primary subject and may increase the blurriness of the data points that are furthest from the primary subject in order to artificially generate a bokeh lens effect. A similar effect may be generated by applying the dynamic decimation to data points with various material properties or color values. For instance, the primary subject may include data points representing a human. A bokeh effect may be generated by dynamically decimating all data points with material properties other than material properties associated with the human (e.g., skin, hair, eyes, etc.), by dynamically decimating all data points with RGB values that are different from the RGB values of the primary subject, or by dynamically decimating and increasing the decimation for the data points that have z-coordinate positions furthest from the data points of the primary subject. Other effects may include using the density-based dynamic decimation to present a point cloud with a consistent resolution and to eliminate inconsistent levels of detail across the point cloud.

In some embodiments, PCES 200 may provide a tool for selecting which of the various dynamic decimations to apply, and for controlling the impact of the selected dynamic decimation and/or the amount of decimation that is applied. For instance, the tool may allow a user to switch between dynamically decimating a selected region based on data point density, color commonality, material property commonality, variation in specific non-positional values (e.g., RGB values, point normals, etc.), distance from the center of the selected region, density of surrounding data points, and/or other techniques described herein.

Figure 12:
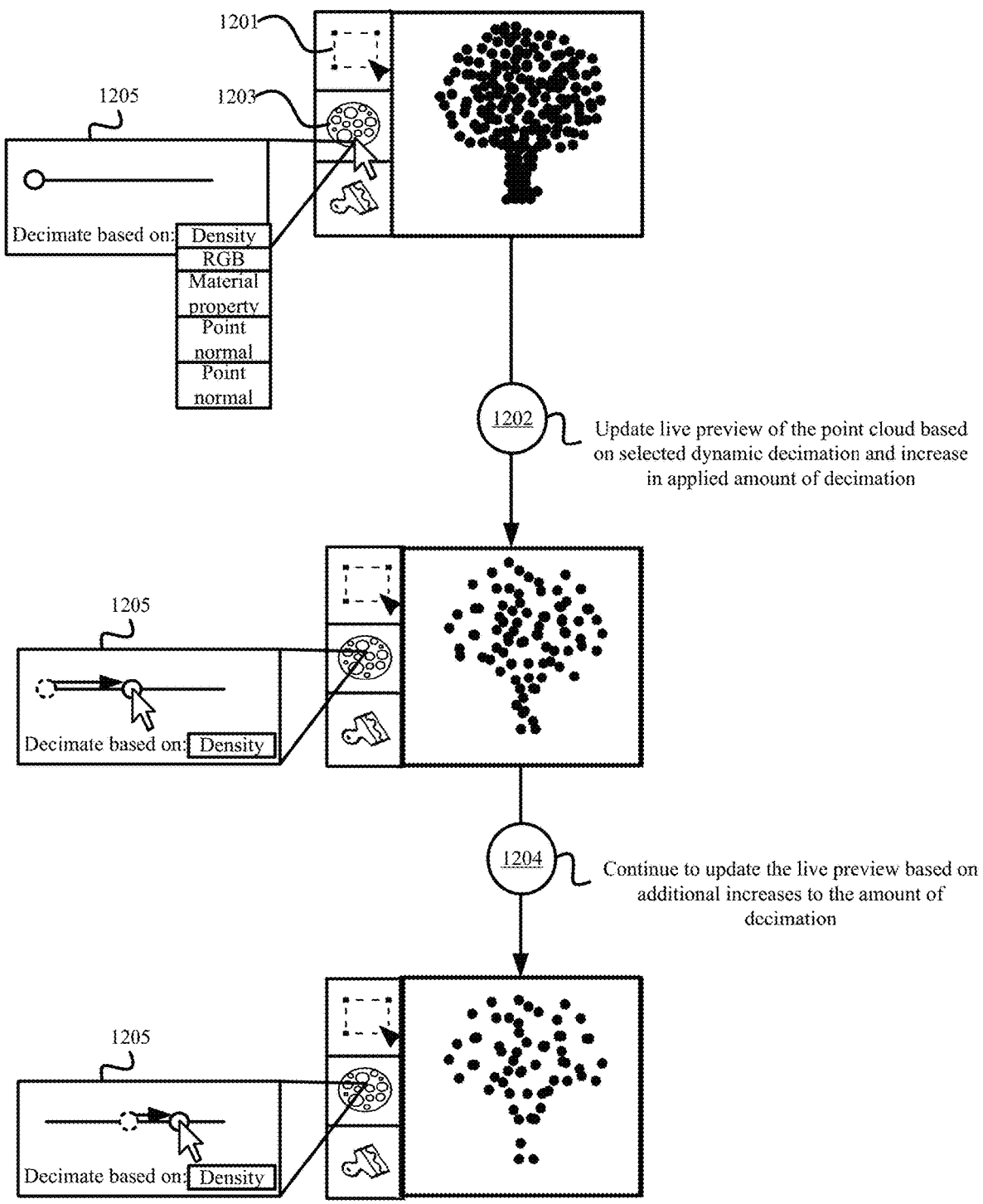
FIG. 12 illustrates an example of the live preview that is generated for the dynamic decimation in accordance with some embodiments presented herein.

PCES 200 may generate a live preview of the decimation effects produced from selections of the different dynamic decimations, and from adjusting the amount of decimation that is applied. FIG. 12 illustrates an example of the live preview that is generated for the dynamic decimation in accordance with some embodiments presented herein.

As shown in FIG. 12, PCES 200 may generate a graphical user interface ("GUI") for invoking and modifying the dynamic decimation. The GUI may include a rendering of a selected point cloud, tool 1201 for selecting a region within the point cloud to decimate, tool 1203 for controlling the dynamic decimation, and various other tools for interacting with or editing the point cloud ion other ways.

In response to selection of tool 1203, PCES 200 may present control interface 1205. Control interface 1205 may include a drop-down selection menu for selecting which dynamic decimation to apply, and a slider for varying the amount of decimation applied with a selected dynamic decimation.

PCES 200 may update the visualization of the selected point cloud in the GUI as the user changes the dynamic decimation selection and/or the moves the slider to increase or decrease the amount of decimation to apply. For instance, PCES 200 may update (at 1202) the point cloud visualization to render the point cloud with a first decimation of the data points in response to the user increasing the amount of decimation, and may continue (at 1204) to update the point cloud visualization to render the point cloud with a second decimation of the data points in response to the user further increasing the amount of decimation.

Figure 13:
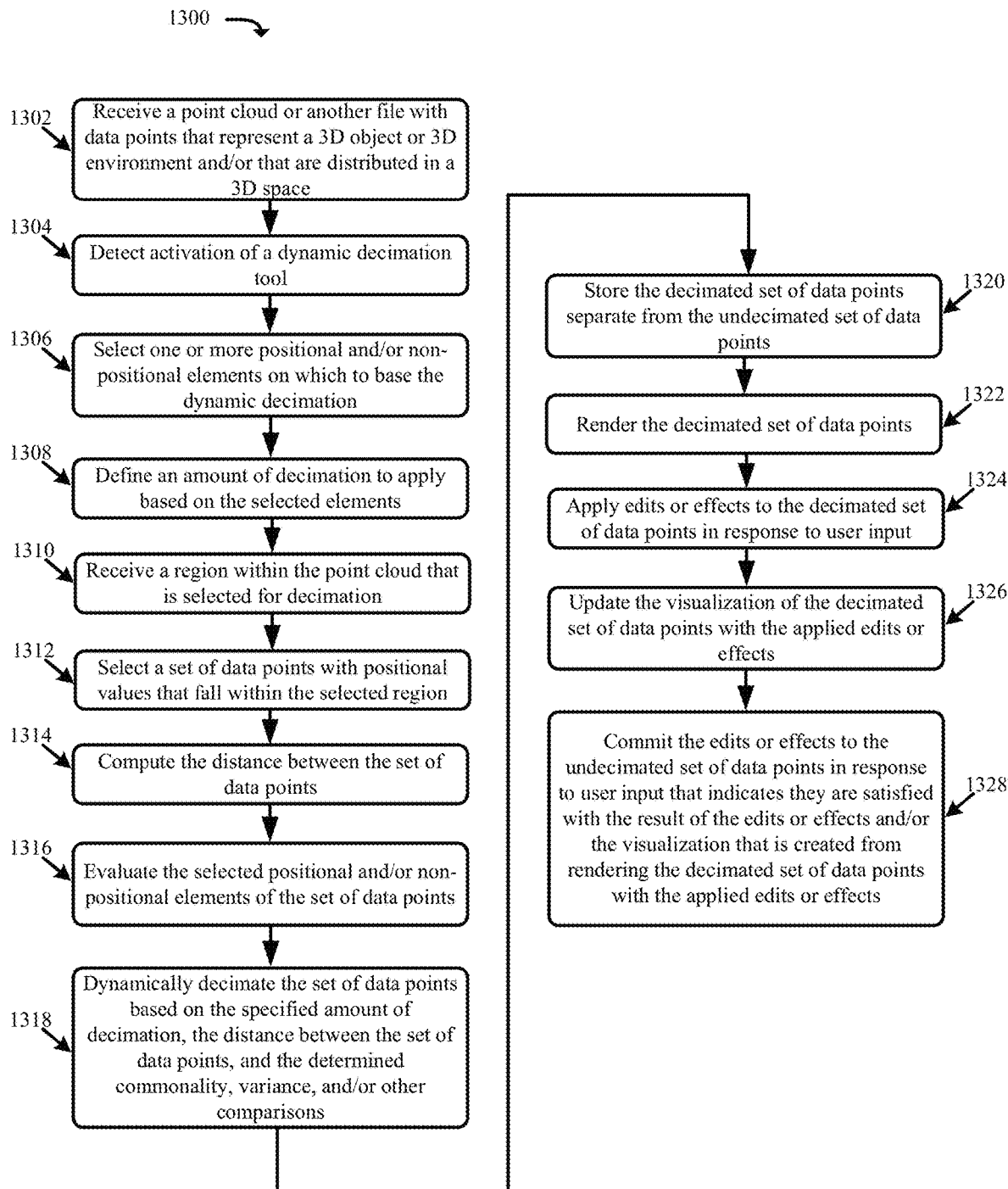
FIG. 13 presents a process for dynamically decimating a point cloud or data points in 3D space in accordance with some embodiments presented herein.

FIG. 13 presents a process 1300 for dynamically decimating a point cloud or data points in 3D space in accordance with some embodiments presented herein. Process 1300 may be implemented by PCES 200 as part of a point cloud or 3D rendering, editing, and/or processing system.

Process 1300 may include receiving (at 1302) a point cloud or another file with data points that represent a 3D object or 3D environment and/or that are distributed in a 3D space. PCES 200 may receive (at 1302) the point cloud in response to a user selecting, opening, loading, and/or otherwise accessing the point cloud for subsequent viewing, editing, and/or interaction.

Process 1300 may include detecting activation (at 1304) of a dynamic decimation tool. For instance, the user may select a GUI element associated with the dynamic decimation tool in order to activate (at 1304) the dynamic decimation tool.

Process 1300 may include selecting (at 1306) one or more positional and/or non-positional elements on which to base the dynamic decimation. For instance, the user may specify performing the dynamic decimation based on data point densities, commonality in color values, variance in point normals, and/or other parameters that vary the application of the dynamic decimation in accordance with some embodiments presented herein.

Process 1300 may include defining (at 1308) an amount of decimation to apply based on the selected elements. The amount of decimation may be specified as a percentage value, a number of data points, a desired file size, and/or other values for controllably increasing or decreasing how many data points to decimate based on the selected elements.

Process 1300 may include receiving (at 1310) a region within the point cloud that is selected for decimation. In some embodiments, the selected region may include a user-specified volume or region of 3D space, or the inverted region that includes the 3D space outside of the user-specified volume or region of 3D space. In some embodiments, the selected region may include the entire point cloud or all data points.

Process 1300 may include selecting (at 1312) a set of data points with positional values that fall within the selected region. The set of data points may include the data points that are candidates for the dynamic decimation.

Process 1300 may include computing (at 1314) the distance between the set of data points. In some embodiments, PCES 200 may compute (at 1314) the distance between each neighboring pair of data points, and/or the distance of each data point to a center and/or edges of the selection region.

Process 1300 may include evaluating (at 1316) the selected positional and/or non-positional elements of the set of data points. Specifically, PCES 200 may evaluate (at 1316) the selected positional and/or non-positional elements to determine if any data points have common values, to determine the variance in the values defined for these elements, and/or to otherwise compare the values defined for these elements relative to one another.

Process 1300 may include dynamically decimating (at 1318) the set of data points based on the specified amount of decimation, the distance between the set of data points, and the determined commonality, variance, and/or other comparisons. Dynamically decimating (at 1318) the set of data points may include non-uniformly and/or non-sequentially remove or replacing various data points from the set of data points. In particular, PCES 200 may determine whether or not to remove or replace a particular data point based on the distance between the particular data point and other surrounding data points and commonality, variance, and/or other comparisons between the selected positional and/or non-positional values for the particular data point and those of the other surrounding data points. Consequently, dynamically decimating (at 1318) the set of data points may include removing or replacing more data points from a first subset of the set of data points, and may include removing or replacing fewer data points from a second subset of the set of data points.

Process 1300 may include storing (at 1320) the decimated set of data points separate from the undecimated set of data points. In other words, PCES 200 may not alter the point cloud, and may retain the decimated set of data points in a separate file or as a separate data structure. The decimated set of data points may consume less memory, require less processing resources, and/or are smaller in size than the undecimated set of data points.

Process 1300 may include rendering (at 1322) the decimated set of data points. Rendering (at 1322) the decimated set of data points may include generating a visualization to present the object or environment represented by the set of data points after one or more of the data points are removed or replaced as a result of the dynamic decimation. In some embodiments, the decimated set of data points may be rendered as part of the overall point cloud and in place of the undecimated set of data points.

Process 1300 may include applying (at 1324) one or more edits or effects to the decimated set of data points in response to user input. The one or more edits or effects may include modifying positional and/or non-positional values for one or more of the decimated set of data points based on editing tools, scripts, and/or commands invoked by the user. Since the decimated set of data points contain fewer data points and data than the undecimated set of data points, the edits or effects may be applied to fewer data points and may require fewer memory, processing, storage, networking, and/or other resources of the computer system being used for the point cloud manipulation than if the edits or effects were applied to the undecimated set of data points or the entirety of the point cloud prior to decimation. In some embodiments, the one or more edits or effects may also include inserting new objects into the 3D space represented by the decimated set of data points.

Process 1300 may include updating (at 1326) the visualization of the decimated set of data points with the applied edits or effects. Once again, updating (at 1326) the visualization of the decimated set of data points with the applied edits or effects may be completed in less time and with fewer computer resource than updating a visualization of the undecimated set of data points.

Process 1300 may include committing (at 1328) the edits or effects to the undecimated set of data points in response to user input that indicates they are satisfied with the result of the edits or effects and/or the visualization that is created from rendering the decimated set of data points with the applied edits or effects. Committing (at 1328) the edits or effects may include transferring the changes that were made to the smaller decimated set of data points over to the larger undecimated set of data points. Specifically, the adjustments made to the positional and/or non-positional values of the decimated set of data points may be mapped to the undecimated set of data points.

Accordingly, process 1300 allows the user to work with a lower resolution/decimated version of the point cloud, process, edit, interact with, and/or otherwise modify the lower resolution/decimated version of the point cloud until a desired outcome is achieved, and apply the same modifications to the higher resolution/undecimated version of the point cloud when complete. The user experience less lag and the computer system is more responsive and performant when testing and visualizing the modifications on the lower resolution/decimated version of the point cloud than on the higher resolution/undecimated version of the point cloud. However, once the modifications are complete, the user may transfer them from the lower resolution/decimated version of the point cloud to the higher resolution/undecimated version of the point cloud in order to generate a higher quality image or environment with the applied edits and/or effects.

Figure 14:
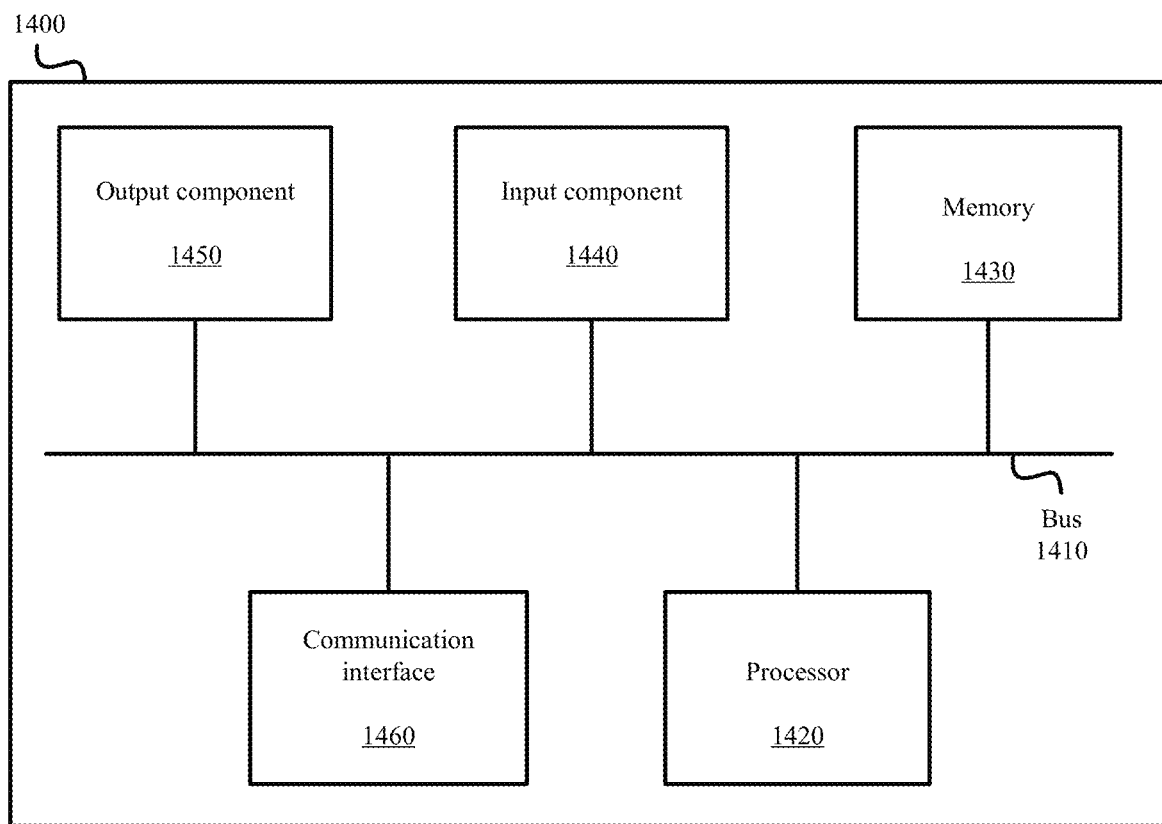
FIG. 14 illustrates example components of one or more devices, according to one or more embodiments described herein.

FIG. 14 is a diagram of example components of device 1400. Device 1400 may be used to implement one or more of the devices or systems described above (e.g., PCES 200). Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more LEDs, etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a set of data points that are distributed in in a particular region, wherein each data point of the set of data points comprises a plurality of elements that define (i) a particular position of the data point in the space, and (ii) visual characteristics of the data point;
   selecting one or more of the plurality of elements with which to decimate the set of data points;
   detecting a first subset of data points distributed amongst the set of data points in the particular region having common values in a first set of the plurality of elements, and a second subset of data points distributed amongst the set of data points in the particular region having different common values in a different second set of the plurality of elements;
   differentiating the first subset of data points from the second subset of data points based on the common values in the first set of elements between the first subset of data points and the common values in the second set of elements between the second subset of data points; and
   performing a non-uniform decimation of the particular region, wherein performing the non-uniform decimation comprises a non-sequential removal or replacement of data points from the set of data points by:
      decimating the first subset of data points by a first amount based on a first difference in values defined for the one or more elements of the first subset of data points; and
      decimating the second subset of data points by a different second amount based on a second difference in values defined for the one or more elements of the second subset of data points.

2. The method of claim 1,
   wherein decimating the first subset of data points by the first amount comprises removing or replacing a first number of data points from the first subset of data points that are distributed across the particular region;
   wherein decimating the second subset of data points by the second amount comprises removing or replacing a second number of data points from the second subset of data points that are distributed across the particular region; and
   wherein the first number of data points is different than the second number of data points.

3. The method of claim 1,
   wherein performing the non-uniform decimation further comprises removing or replacing more data points from the first subset of data points in the particular region than from the second subset of data points in the particular region.

4. The method of claim 1 further comprising:
   computing a distance between the set of data points; and
   setting the first amount of decimation to be greater than the second amount of decimation in response to the distance between the first subset of data points being less than the distance between the second subset of data points.

5. The method of claim 1 further comprising:
   computing the first difference based on the particular position of each data point in the first subset of data points yielding a first density of data points;

defining the first amount of decimation based on the first density of data points;

computing the second difference based on the particular position of each data point in the second subset of data points yielding a different second density of data points;

defining the second amount of decimation based on the second density of data points; and wherein performing the non-uniform decimation further comprises decimating the first subset of data points in the particular region more than the second subset of data points in the particular region.

6. The method of claim 1 further comprising:

computing the first difference based on the visual characteristics of the first subset of data points having a first commonality;

defining the first amount of decimation based on the first commonality in the visual characteristics of the first subset of data points;

computing the second difference based on the visual characteristics of the second subset of data points having a different second commonality; and defining the second amount of decimation based on the second commonality in the visual characteristics of the second subset of data points.

7. The method of claim 1 further comprising:

computing the first difference based on a first amount of variation in the visual characteristics of the first subset of data points;

computing the second difference based on a different second amount of variation in the visual characteristics of the second subset of data points; and defining the first amount of decimation to be greater than the second amount of decimation based on the first amount of variation being less than the second amount of variation.

8. The method of claim 1, wherein decimating the first subset of data points comprises:

determining that the visual characteristics of a first data point from the first subset of data points are within a threshold range of the visual characteristics of a neighboring second point and are not within the threshold range of the visual characteristics of a neighboring third data point from the first subset of data points;

replacing the first data point and the neighboring second data point with a single data point; and retaining the neighboring third data point without modification.

9. The method of claim 1 further comprising:

determining that the first subset of data points comprises a subregion with highlights;

determining that the second subset of data points comprises a subregion with lowlights;

wherein decimating the first subset of data points comprises retaining the visual characteristics of data points in the first subset of data points that contribute to the highlights and removing the visual characteristics of data points in the first subset of data points that do not contribute to the highlights; and wherein decimating the second subset of data points comprises retaining the visual characteristics of data points in the second subset of data points that contribute to the lowlights and removing the visual characteristics of data points in the second subset of data points that do not contribute to the lowlights.

10. The method of claim 1 further comprising:

determining that the first subset of data points represent an edge or convergence of two surfaces based on the first difference in the values defined for the one or more elements of the first subset of data points;

determining that the second subset of data points represent a uniform surface based on the second difference in the values defined for the one or more elements of the second subset of data points; and defining the second amount of decimation to be greater than the first amount of decimation in order to preserve detail at the edge or the convergence of the two surfaces and reduce detail over the uniform surface.

11. The method of claim 1 further comprising:

rendering a decimated data point set resulting from decimating the first subset of data points and the second subset of data points, wherein rendering the decimated data point set comprises generating a visualization based on less than all the set of data points.

12. The method of claim 1, wherein the set of data points are stored as part of a point cloud representing a three-dimensional ("3D") object or a 3D environment.

13. The method of claim 8 further comprising:

defining the visual characteristics of the single data point based on an average of the visual characteristics of the first data point and the neighboring second data point.

14. The method of claim 11 further comprising:

applying one or more edits or effects to the decimated data point set; and updating the visualization to present the decimated data point set with the one or more edits or effects.

15. The method of claim 13 further comprising:

defining the particular position of the single data point based on an average of the particular position of the first data point and the neighboring second data point.

16. The method of claim 14 further comprising:

committing the one or more edits or effects to the set of data points after updating the visualization, wherein committing the one or more edits or effects comprises applying the one or more edits or effects to the set of data points after receiving input indicating satisfaction with the visualization resulting from applying the one or more edits or effects to the decimated data point set.

17. A system comprising:

one or more hardware processors configured to:

receive a set of data points that are distributed in a space, wherein each data point of the set of data points comprises a plurality of elements that define (i) a particular position of the data point in the space, and (ii) visual characteristics of the data point;

select one or more of the plurality of elements with which to decimate the set of data points;

detect a first subset of data points distributed amongst the set of data points in the particular region having common values in a first set of the plurality of elements, and a second subset of data points distributed amongst the set of data points in the particular region having different common values in a different second set of the plurality of elements;

differentiate the first subset of data points from the second subset of data points based on the common values in the first set of elements between the first subset of data points and the common values in the second set of elements between the second subset of data points; and perform a non-uniform decimation of the particular region, wherein performing the non-uniform decimation comprises a non-sequential removal or replacement of data points from the set of data points by:
  decimating the first subset of data points by a first amount based on a first difference in values defined for the one or more elements of the first subset of data points; and
  decimating the second subset of data points by a different second amount based on a second difference in values defined for the one or more elements of the second subset of data points.

18. The system of claim 17,
wherein decimating the first subset of data points by the first amount comprises removing or replacing a first number of data points from the first subset of data points that are distributed across the particular region;
wherein decimating the second subset of data points by the second amount comprises removing or replacing a second number of data points from the second subset of data points that are distributed across the particular region; and
wherein the first number of data points is different than the second number of data points.

19. The system of claim 17,
wherein performing the non-uniform decimation further comprises removing or replacing more data points from the first subset of data points in the particular region than from the second subset of data points in the particular region.

20. A non-transitory computer-readable medium storing program instructions that, when executed by one or more hardware processors of a system, cause the system to:
  receive a set of data points that are distributed in a space, wherein each data point of the set of data points comprises a plurality of elements that define (i) a particular position of the data point in the space, and (ii) visual characteristics of the data point;
  select one or more of the plurality of elements with which to decimate the set of data points;
    detect a first subset of data points distributed amongst the set of data points in the particular region having common values in a first set of the plurality of elements, and a second subset of data points distributed amongst the set of data points in the particular region having different common values in a different second set of the plurality of elements;
    differentiate the first subset of data points from the second subset of data points based on the common values in the first set of elements between the first subset of data points and the common values in the second set of elements between the second subset of data points; and
  perform a non-uniform decimation of the particular region, wherein performing the non-uniform decimation comprises a non-sequential removal or replacement of data points from the set of data points by:
    decimating the first subset of data points by a first amount based on a first difference in values defined for the one or more elements of the first subset of data points; and
    decimating the second subset of data points by a different second amount based on a second difference in values defined for the one or more elements of the second subset of data points.

* * * * *